US007986376B2

(12) United States Patent
Saito et al.

(10) Patent No.: US 7,986,376 B2
(45) Date of Patent: Jul. 26, 2011

(54) LIQUID CRYSTAL DISPLAY DEVICE

(75) Inventors: Taku Saito, Mobara (JP); Shuuichirou Matsumoto, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 484 days.

(21) Appl. No.: 12/292,260

(22) Filed: Nov. 14, 2008

(65) Prior Publication Data

US 2009/0128723 A1 May 21, 2009

(30) Foreign Application Priority Data

Nov. 19, 2007 (JP) ................................ 2007-298784

(51) Int. Cl.
*G09G 3/36* (2006.01)
*G02F 1/141* (2006.01)
*G02F 1/133* (2006.01)

(52) U.S. Cl. ............................... 349/37; 345/50; 345/97

(58) Field of Classification Search ........................ None
See application file for complete search history.

(56) References Cited

U.S. PATENT DOCUMENTS

| | | | | |
|---|---|---|---|---|
| 2007/0063944 A1* | 3/2007 | Sato et al. | ....................... | 345/87 |
| 2008/0297673 A1* | 12/2008 | Takahashi | ....................... | 349/37 |
| 2009/0231257 A1* | 9/2009 | Ooki et al. | ....................... | 345/89 |

* cited by examiner

*Primary Examiner* — Michelle R Connelly Cushwa
(74) *Attorney, Agent, or Firm* — Stites & Harbison PLLC; Juan Carlos A. Marquez, Esq.

(57) ABSTRACT

It is possible to realize a driver circuit which exhibits low power consumption and high image quality in a liquid crystal display device used in miniaturized portable equipment. In a liquid crystal display device which includes a liquid crystal display element and a liquid crystal driver circuit, the liquid crystal driver circuit is mounted on one side of a liquid crystal display panel. The liquid crystal driver circuit can output counter electrode voltages of two systems and hence, the liquid crystal driver circuit can select a first mode in which the first counter voltage and the second counter voltage have the opposite polarities from each other and a second mode in which the first counter voltage and the second counter voltage have the same polarity. Due to such constitution, while driving the liquid crystal display device in the first mode, the second mode is selected depending on a video signal thus realizing power saving.

9 Claims, 8 Drawing Sheets

LIQUID CRYSTAL DISPLAY DEVICE

CROSS-REFERENCE TO RELATED APPLICATIONS

The disclosure of Japanese Patent Application No. 2007-298784 filed on Nov. 19, 2007 including the specification, drawings and abstract is incorporated herein by reference in its entirety.

BACKGROUND OF THE INVENTION

1. Field of the Invention

The present invention relates to a liquid crystal display device, and more particularly to a technique which is effectively applicable to a driver circuit of a liquid crystal display device used in a display part of a portable device.

2. Description of the Related Arts

A TFT (thin film transistor)-method liquid crystal display device has been popularly used as a display device of a personal computer, a television receiver set or the like. Such a liquid crystal display device includes a liquid crystal display panel and a driver circuit which drives the liquid crystal display panel.

With respect to such a liquid crystal display device, a miniaturized liquid crystal display device has been popularly used as a display device of portable equipment such as a mobile phone. In using the liquid crystal display device as the display device of the portable equipment, there has been a demand for a liquid crystal display device which can cope with complicated display modes compared to a conventional liquid crystal display device.

Japanese Patent Laid-open Hei08-211411 (Patent document 1) discloses a liquid crystal display device having counter electrodes belonging to two systems, wherein the liquid crystal display device adopts common voltages of opposite phases which invert polarities thereof from each other for every 1 frame. However, patent document 1 merely discloses the common voltages belonging to two systems and neither discloses nor suggests a control of outputting of the common voltages belonging to two systems.

SUMMARY

As a display device of portable equipment, the liquid crystal display device is required to satisfy the further reduction of power consumption. For this end, a driver circuit which is driven at a low voltage is developed. Further, in a conventional liquid crystal display device, a gradation voltage applied to a pixel electrode is inverted while setting a common voltage to a fixed value. However, there has been proposed so-called common AC driving which also changes a common voltage to polarity opposite to polarity of a voltage applied to a pixel electrode for realizing low-voltage driving.

However, this common AC driving has a drawback that the common voltage is changed depending on a magnitude of a voltage written in the pixel electrode or a length of a signal line.

That is, in common AC driving, during a period in which one row is scanned, a common voltage of positive polarity or negative polarity is supplied to all pixels which constitute the row to be scanned through one common line.

In such a method, when the number of pixels in the lateral direction becomes large, a quantity of charge supplied by one common line is increased resulting in shortage of charge supply ability of a power source. Further, when the number of pixels in the longitudinal direction is increased and a frame frequency is held at the same frequency, a period for scanning 1 row becomes short and hence, a time necessary for sufficiently supplying a charge through 1 common line also becomes insufficient. Accordingly, a drawback that the common voltage is changed due to a change of the voltage of the pixel electrode becomes conspicuous.

Further, along with the realization of a higher resolution, it is necessary to supply a larger quantity of electric current within a shorter period and hence, it is necessary to reduce line resistance to suppress a change of the common voltage to a level which does not cause a problem with respect to a display. However, there has been also a demand for a larger numerical aperture, and it is necessary to decrease a width of the common line to realize the larger numerical aperture to the contrary.

The present invention has been made to overcome the above-mentioned drawbacks of the related art, and it is an object of the present invention to provide a miniaturized liquid crystal display device having a driver circuit and a liquid crystal display panel which are configured to apply a common voltage in a stable manner.

The above-mentioned and other objects and novel features of the present invention will become apparent from the description of this specification and attached drawings.

To briefly explain the summary of typical inventions among inventions described in this specification, they are as follows.

A liquid crystal display device includes two substrates, liquid crystal composition which is sandwiched between two substrates, a plurality of pixels which are formed on the substrate, pixel electrodes each of which is formed on the pixel, counter electrodes which face the pixel electrodes in an opposed manner, switching elements which are configured to supply video signals to the pixel electrodes in an ON state, video signal lines which are configured to supply video signals to the switching elements, scanning signal lines which are configured to supply scanning signals for controlling an ON/OFF state of the switching elements, counter electrode signal lines which are configured to supply a counter voltage to the counter electrodes, and a driver circuit which is configured to output the video signals, the scanning signals and the counter voltage.

A first scanning signal line and a second scanning signal line which are arranged adjacent to each other are provided with first pixel electrodes to which the video signals are supplied from the switching elements which are controlled in response to the scanning signals supplied through the first scanning signal line, and second pixel electrodes to which the video signals are supplied from the switching elements which are controlled in response to the scanning signals supplied through the second scanning signal line, a first counter electrode signal line is connected to the counter electrodes which face the first pixel electrodes in an opposed manner, and a second counter electrode signal line is connected to the counter electrodes which face the second pixel electrodes in an opposed manner.

During a first scanning period in which the scanning signals are outputted to the first scanning signal line, the liquid crystal display device is driven in a first mode in which the counter voltage having polarity opposite to polarity of the voltage applied in the immediately-before frame period is supplied to the counter electrode of the second pixel electrode, and polarity of a voltage applied to the first counter electrode signal line and polarity of a voltage applied to the second counter electrode signal line are set opposite to each other.

It is necessary to continuously output the video signals having the same polarity to the video signal line for realizing power saving. According to the present invention, the liquid crystal display device can select a second mode in which the voltage applied to the first counter electrode signal line and the voltage applied to the second counter electrode signal line have the same polarity.

During a retracing period in which the scanning signal is not outputted to the scanning signal line, the liquid crystal display device is configured to be capable of selecting a second mode in which the voltage applied to the first counter electrode signal line and the voltage applied to the second counter electrode signal line have the same polarity.

Further, at the time of performing the scanning line simultaneous driving in which the scanning signal is simultaneously outputted to a plurality of scanning signal lines, the liquid crystal display device can select a second mode in which the voltage applied to the first counter electrode signal line and the voltage applied to the second counter electrode signal line have the same polarity.

The counter voltage for positive polarity and the counter voltage for negative polarity can be supplied using the counter electrode signal lines of two systems. By providing the circuit which supplies the counter voltage for positive polarity and the counter voltage for negative polarity to the driver circuit, a quantity of charge supplied through one circuit can be reduced thus making it possible to sufficiently drive the counter electrodes. Accordingly, the fluctuation of the counter voltage can be suppressed.

Further, a mode for outputting the counter voltage to the counter electrode signal lines of two systems can be changed over between the first mode in which the voltages having opposite polarities are outputted and the second mode in which the voltages having the same polarity are outputted and hence, the video signal can be continuously outputted with a fixed polarity by changing the voltage outputting mode to the second mode whereby the present invention is also applicable to power saving.

Further, the optimum counter voltage can be selected during a retracing period in which signals are not written in the pixel electrodes or at the time of simultaneously driving scanning lines through which the plurality of scanning signals are outputted and hence, it is possible to provide the liquid crystal panel of high display quality.

DETAILED DESCRIPTION OF THE INVENTION

Hereinafter, an embodiment of the present invention is explained in detail in conjunction with drawings. Here, in all drawings for explaining the embodiment, parts having identical functions are given same symbols and their repeated explanation is omitted.

Figure 1:
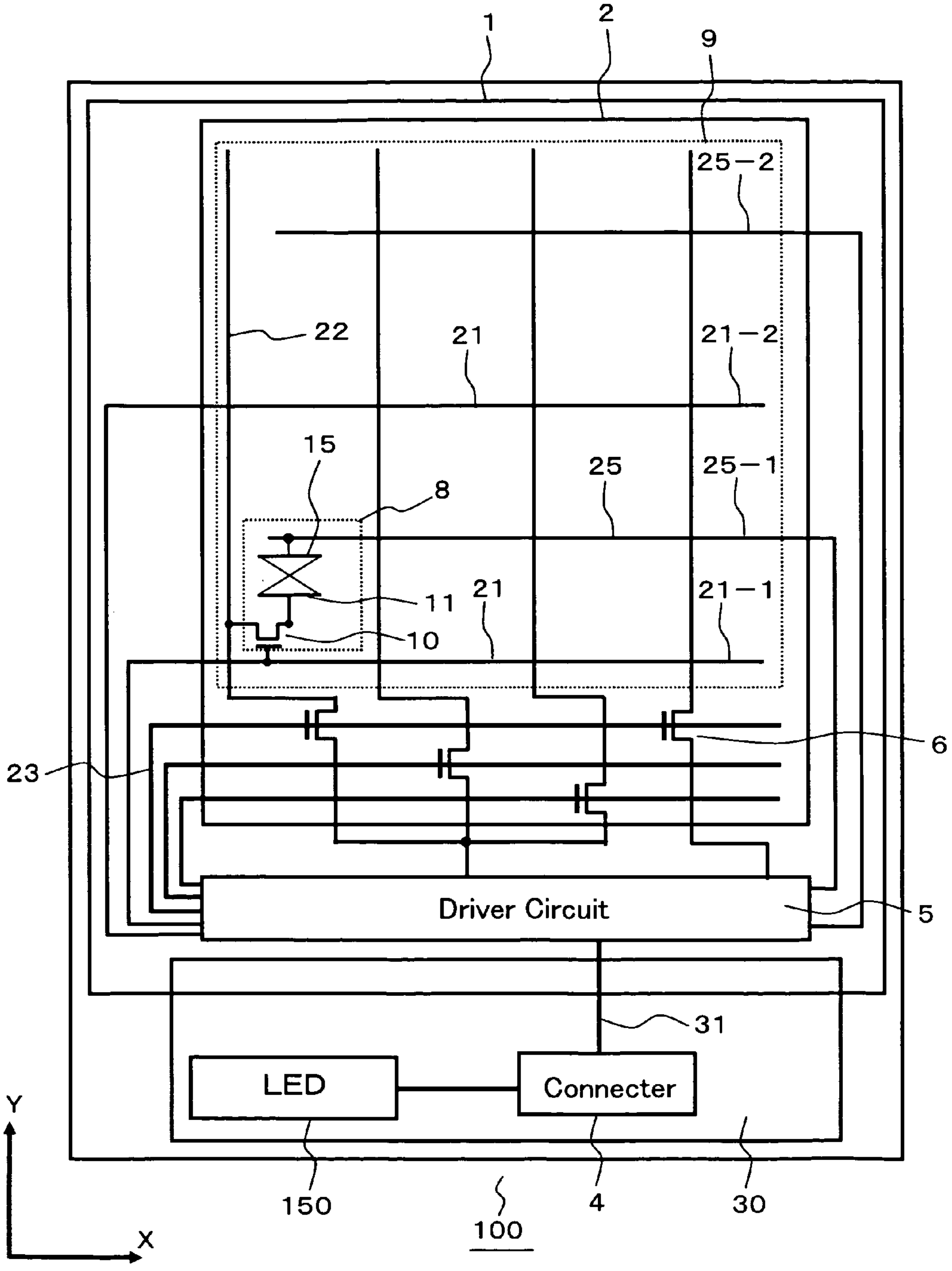
FIG. 1 is a schematic block diagram showing a liquid crystal display device of an embodiment 1 according to the present invention.

FIG. 1 is a block diagram showing the basic constitution of a liquid crystal display device of the embodiment according to the present invention. As shown in FIG. 1, the liquid crystal display device 100 of this embodiment is constituted of a liquid crystal display panel 1, a driver circuit 5 and a flexible printed circuit board 30.

The liquid crystal display panel 1 is configured as follows. A TFT substrate 2 on which thin film transistors 10, pixel electrodes 11, counter electrodes 15 and the like are formed and a filter substrate (not shown in the drawing) on which color filters and the like are formed overlap with each other with a predetermined gap therebetween. Both substrates are adhered to each other using a frame-shaped sealing material (not shown in the drawing) arranged between both substrates and in the vicinity of peripheral portions of both substrates and, at the same time, liquid crystal composition is filled and sealed in a space defined by both substrate and the sealing material. Further, a polarizer is adhered to outer surfaces of both substrates.

Here, the embodiment of the present invention is applicable to both of a so-called IPS-method liquid crystal display panel in which the counter electrodes 15 are arranged on the TFT substrate 2 and a so-called vertical-electric-field-method liquid crystal display panel in which the counter electrodes 15 are arranged on the filter substrate in the same manner.

In FIG. 1, scanning signal lines (also referred to as gate signal lines) 21 which extend in the x direction and are arranged parallel to each other in the y direction in the drawing and video signal lines (also referred to as drain signal lines) 22 which extend in the y direction and are arranged parallel to each other in the x direction in the drawing are formed on the TFT substrate 2, and a pixel portion 8 is formed in each region which is surrounded by the scanning signal lines 21 and the drain signal lines 22.

Here, although the liquid crystal display panel 1 includes a large number of pixel portions 8 in a matrix array, for facilitating the understanding of the drawing, only one pixel portion 8 is shown in FIG. 1. The pixel portions 8 arranged in a matrix array form a display region 9, the respective pixel portions 8 play a role of pixels of a display image, and an image is displayed in the display region 9.

The thin film transistor 10 of each pixel portion 8 has a source thereof connected to the pixel electrode 11, has a drain thereof connected to the video signal line 22, and has a gate thereof connected to the scanning signal line 21. The thin film transistor 10 functions as a switch for supplying a display voltage (gradation voltage) to the pixel electrode 11.

Here, although naming of "source" and "drain" may be reversed based on the relationship of biases, in this embodiment, the terminal which is connected to the video signal line 22 is referred to as the drain.

The driver circuit 5 is arranged on a transparent insulation substrate (glass substrate, resin substrate or the like) which constitutes the TFT substrate 2. The scanning signal lines 21, the video signal lines 22, distribution signal lines 23 and counter electrode signal lines 25 are connected to the driver circuit 5.

The flexible printed circuit board 30 is connected to the TFT substrate 2. The flexible printed circuit board 30 includes a connector 4 and an LED 150.

The connector 4 is connected to an external signal line so as to allow inputting of signals to the flexible printed circuit board 30 from the outside. A line 31 is provided between the connector 4 and the driver circuit 5 for allowing the signals from the outside to be inputted to the driver circuit 5.

A constant voltage is supplied to the LED (light emitting diode) 150 via the connector 4. The LED 150 is used as a light source of the liquid crystal display device 100.

A control signal transmitted from a control device (not shown in the drawing) arranged outside the liquid crystal display device 100 and a power source voltage supplied from an external power source circuit (not shown in the drawing) are inputted to the driver circuit 5 via the connector 4 and the line 31.

Signals inputted to the driver circuit 5 from the outside are control signals including a clock signal, a display timing signal, a horizontal synchronizing signal, a vertical synchronizing signal and the like, display-use data (R•G•B) and a display mode control command. The driver circuit 5 drives the liquid crystal display panel 1 in response to the inputted signals.

The driver circuit 5 is constituted of a single-chip semiconductor integrated circuit (LSI). The driver circuit 5 includes an output circuit for outputting the scanning signals to the scanning signal lines 21, an output circuit for outputting the video signals to the video signal lines 22, and an output circuit for outputting counter voltages to the counter electrode signal line 25. Based on a reference clock generated inside the driver circuit 5, the driver circuit 5 sequentially supplies a selection voltage (scanning signal) of “High” level to the respective scanning signal lines 21 of the liquid crystal display panel 1 for every 1 horizontal scanning period. Due to such an operation, the plurality of thin film transistors 10 connected to each scanning signal line 21 of the liquid crystal display panel 1 allows the electrical conduction between the video signal lines 22 and the pixel electrodes 11 for 1 horizontal scanning period.

Further, the driver circuit 5 outputs a gradation voltage corresponding to a gradation to be displayed by the pixels to the video signal lines 22 via the distribution transistor 6. When the thin film transistors 10 assume an ON state (become conductive), the gradation voltage (video signal) is supplied to the pixel electrodes 11 from the video signal lines 22. Thereafter, when the thin film transistors 10 are brought into an OFF state, the gradation voltage based on a video to be displayed by the pixels is held in the pixel electrodes 11.

The distribution transistor 6 distributes the video signal outputted from the driver circuit 5 to three video signal lines 22, for example. Although the distribution transistor distributes the video signal to three video signal lines 22 in FIG. 1, the number of the video signal lines 22 to which the distribution transistor 6 can distribute the video signal may be set to six or more.

Further, in performing AC driving, the driver circuit adopts common inversion driving in which a counter voltage which inverts a polarity thereof for every fixed period is outputted to the counter electrode signal lines 25. Further, signals are outputted from the driver circuit 5 via counter electrode signal lines 25 belonging to two systems. The counter electrode signal line of one system is indicated by numeral 25-1, and the counter electrode signal line of another system is indicated by numeral 25-2.

The liquid crystal display panel 1 has the counter electrode signal line 25-1 of the first system and the counter electrode signal line 25-2 of the second system and hence, it is possible to supply a counter electrode voltage using the counter electrode signal lines of two systems whereby the ability of the driver circuit 5 to supply the counter voltage to the counter electrodes 15 of the respective pixels 8 can be enhanced.

Further, the counter electrode signal line 25-1 of the first system and the counter electrode signal line 25-2 of the second system are formed corresponding to two neighboring scanning signal lines 21. To explain this relationship with respect to the first scanning signal line 21-1 and the second scanning signal line 21-2 which are arranged adjacent to each other in FIG. 1, the counter electrode signal line 25-1 of the first system supplies the counter voltage to the pixels 8 which are electrically connected with the first scanning signal line 21-1, and the counter electrode signal line 25-2 of the second system supplies the counter voltage to the pixels 8 which are electrically connected with the second scanning signal line 21-2.

Due to such constitution, by inverting the polarity of the counter voltage of the counter electrode signal line 25-1 of the first system and the polarity of the counter voltage of the counter electrode signal line 25-2 of the second system from each other, it is possible to drive the liquid crystal display device by inverting the polarity of the video signal voltage supplied to the pixels 8 which are electrically connected with the first scanning signal line, and the polarity of the video signal voltage supplied to the pixels 8 which are electrically connected with the second scanning signal line.

Figure 2:
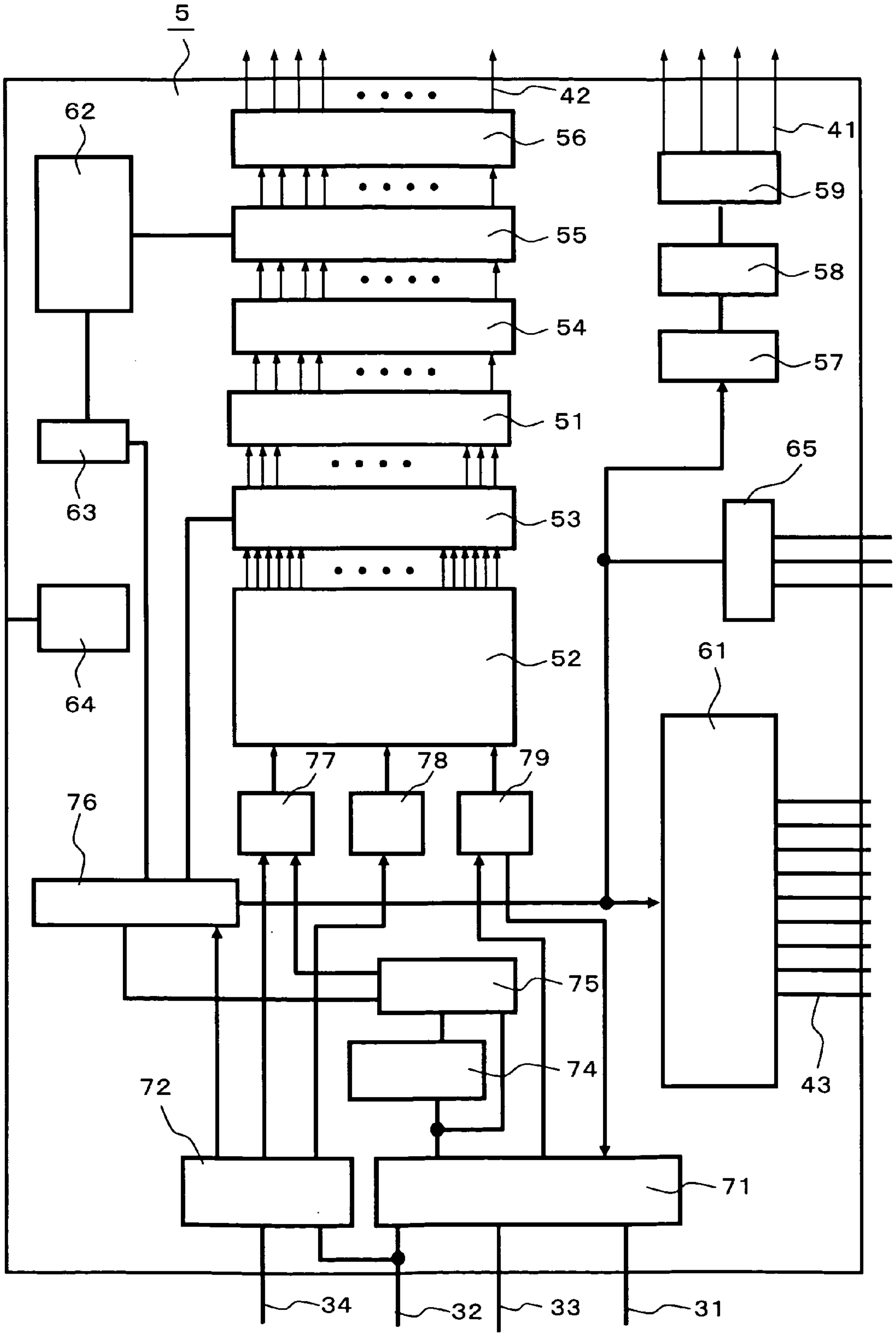
FIG. 2 is a schematic block diagram showing the liquid crystal display device of the embodiment 1 according to the present invention.

Next, FIG. 2 is a block diagram showing the inside of the driver circuit 5. Control signals and video signals are inputted to a system interface 71 of the driver circuit 5 via terminals for inputting external signals, while video signals are inputted to an external display interface 72. Further, signals and voltages necessary for driving the liquid crystal display panel 1 are outputted from scanning signal terminals 41, video signal output lines 42 and voltage outputting terminals 43 which constitute output terminals.

The driver circuit 5 incorporates a graphic RAM 52 therein as described later, and the graphic RAM 52 stores display data therein. In driving the liquid crystal display panel 1, an address of the graphic RAM 52 corresponding to the liquid crystal display panel 1 is designated, and display data is written in the graphic RAM 52. The driver circuit 5 outputs gradation voltages to the liquid crystal display panel 1 based on the display data in the graphic RAM 52.

To realize the low power consumption particularly, a partial display which displays only a necessary minimum portion is performed within the display region 9. In performing such a partial display, at the time of displaying a standby screen on a mobile phone, for example, a fixed pattern display region indicative of a remaining battery quantity, time or the like is formed in a portion of the display region 9 of the liquid crystal display device 100, and other regions are designated as non-lit regions thus driving only the fixed pattern display region at the time of performing a power saving operation.

In performing the partial display, the display data of the graphic RAM 52 is outputted in a portion of the display region 9 and other portions of the display region 9 are designated as the non-lit regions where the display data of the graphic RAM 52 is not outputted. A voltage which brings about a black display or a white display irrespective of the display data is outputted to the non-lit region of the liquid crystal display panel 1 as the video signal.

Further, the liquid crystal display panel 1 can also perform a gradation display with gradations whose number is equal to or below the number of displayable gradations. For example, although the number of gradations which can be displayed at maximum is 260,000 colors, there is a demand for the reduction of the number of gradations to an 8-color display at the time of displaying a standby screen for power saving.

Further, in forming the non-lit regions on up and lower portions of the display region, there also exists a demand for power saving by outputting a scanning signal to the plurality of scanning signal lines simultaneously thus writing a gradation voltage for a black display to a plurality of rows selected simultaneously. That is, when the black display continues over the plurality of rows, by writing the gradation voltage corresponding to the black display collectively over the plurality of rows, the repetition of the writing operation can be omitted thus realizing the power saving.

The driver circuit 5 has various display modes for power saving as described above and hence, it is necessary to output the optimum video signal and counter electrode voltage for every display mode.

For this end, various display modes are designated from the outside via the system interface 71 and, at the same time, outputting of the counter electrode voltage is also controlled by the driver circuit 5 in response to an instruction signal. The driver circuit 5 is configured to cope with various display modes based on the instruction signal. Here, by forming the driver circuit 5 by a single IC chip, it is possible to realize a multi-functional driver circuit by suppressing a mounting area of the driver circuit 5 to a small area.

Further, recently, there has been developed a mobile phone having various functions other than the above-mentioned various display modes and hence, a liquid crystal display device used in the mobile phone is also requested to cope with such various display modes.

Accordingly, functions of the driver circuit 5 are also increased in number to cope with the liquid crystal display panels 1 of various specifications and hence, the driver circuit 5 is also requested to control these respective functions. The driver circuit 5 used in the liquid crystal display device 100 of the present invention includes registers and executes various functions by setting values of the registers.

Further, to obviate cumbersomeness in setting the large number of registers, the driver circuit 5 may also adopt an automatic sequence function. However, when the automatic sequence function is adopted, it is necessary to limit functions preliminarily and hence, it is necessary to provide the custom specification for every liquid crystal display panel. Accordingly, it is necessary to prepare the driver circuit having the different specification for every liquid crystal display panel.

Besides the above-mentioned constitutions, an EPROM is provided in addition to the driver circuit 5, set values of the registers are stored corresponding to the respective liquid crystal display panels, and instruction signals are inputted to the driver circuit 5 from an external control circuit and hence, the respective necessary set values can be read from the EPROM.

In general, setting of the instruction signals is performed via the system interface 71. The system interface 71 includes two kinds of interfaces consisting of a bus interface of arbitrary n bits such as 18 bits or 16 bits and a clock-synchronous-serial interface, and can cope with both parallel and serial signals supplied from an external control circuit such as an MPU (Micro Processing Unit).

The driver circuit 5 includes 16-bit registers such as an index register 74 and a control register 75, and 18-bit registers such as a write data register 78 and a read data register 79. Data is read from or written into the respective registers via the system interface 71. Numeral 31 indicates an input signal line and numeral 32 indicates an output signal line. Numeral 33 indicates a verifying signal output line. The collation of input and output data becomes possible with the use of the verifying signal.

Further, an external display interface 72 includes an RGB interface and a vertical synchronizing interface for an animated picture display, and video signals are inputted to the external display interface 72 from the outside via an input signal line 34. In operating the RGB interface, display data is fetched at the same timing that a vertical synchronizing signal and a horizontal synchronizing signal are supplied from the outside.

At the time of operating the vertical synchronizing interface, frame synchronization is conducted in response to the vertical synchronizing signal, and the display data is fetched in response to an internal clock.

The index register 74 is a register for storing access information for the control register 75 or the graphic RAM 52, and addresses of the control register 75 and the graphic RAM 52 can be designated by the index register 74.

The control register 75 can designate various functions of the driver circuit 5. The driver circuit 5 can control the display operation based on values set in the control register 75. For example, the control register 75 can designate the number of the signal lines driven by the timing generation circuit 76 or the like.

The write data register 78 temporarily stores data to be written in the graphic RAM 52. In accordance with set values in the control register 75, values set in the address counter 77 described later and values of various control terminals, the display data which is temporarily stored in the write data register 78 is written in the graphic RAM 52 via the external display interface 72.

The read data register 79 is a register which temporarily stores data read from the graphic RAM 52. In accordance with the set values in the control register 75, the values in the address counter 77 described later and the values of various control terminals, the read data register 79 outputs the temporarily stored data to the outside.

The address counter 77 is a counter which gives an address to the graphic RAM 52. When an instruction for setting an address is written in the index counter 74, the address information is transmitted to the address counter 77 from the index counter 74.

The graphic RAM 52 has the constitution of 18 bits per 1 pixel, for example, incorporates an SRAM (Static RAM) which stores bit pattern data of 172,800 bytes therein, and can cope with a display of a size of 240RGB×320 at maximum.

The timing generation circuit 76 generates timing signals for operating internal circuits necessary for a display. That is, the timing generation circuit 76 generates interface signals such as a signal for read timing of the graphic RAM 52 necessary for a display or a signal for internal operation timing corresponding to an access from the outside.

The latch circuit 53 temporarily holds digital data corresponding to outputting from the video signal line side 240. When signals to be outputted are prepared in the latch circuit 53, the latch circuit 53 outputs the display data to the RGB data selector circuit 51.

The RGB data selector circuit 51, in synchronism with a control of the distribution transistor 6 incorporated in the liquid crystal display panel 1, selects respective data of RGB from the latch circuit 53 and outputs the data to the first level shifter 54.

The first level shifter 54 converts a voltage level of a signal held by the latch circuit 53 and allows the signal to have a voltage necessary for controlling the decoder circuit 55.

The decoder circuit 55 outputs a gradation voltage in accordance with an inputted signal. The voltage outputted from the decoder circuit 55 is subject to the current amplification by the first output circuit 56 and the current-amplified voltage is outputted to the video signal output lines 42.

The video signal output lines 42 are electrically connected with the video signal lines 22 of the liquid crystal display panel so that the gradation voltage is outputted to the video signal lines 22. The number of video signal lines 22 to which the gradation voltage is outputted, the position of the video signal line 22 from which outputting of the gradation voltage is started and the like are set by the control register in response to instruction signals.

On the other hand, the driver circuit 5 includes a scanning signal generation circuit 57 for the scanning signal lines 21. A scanning timing signal is outputted from the scanning signal generation circuit 57, a voltage of the scanning timing signal is converted by a second level shift circuit, and a scanning signal is outputted to the scanning signal terminals 41 connected with scanning signal lines from a second output circuit 59.

The gradation voltage generation circuit 62 generates a gradation voltage and supplies the gradation voltage to the decoder circuit 55. A γ regulation circuit 63 approximates a rate of the increase/decrease of a gradation voltage to a γ function thus realizing a change of brightness suitable for characteristics of an eye of a human. The regulator 64 outputs a power source voltage for an internal logic circuit.

The RGB data selector control circuit 65 generates a signal for controlling an ON/OFF state of the distribution transistor 6 formed on the liquid crystal display panel 1, and outputs the signal to the liquid crystal display panel 1. The liquid crystal drive voltage generation circuit 61 generates a voltage necessary for driving the liquid crystal display panel and outputs the voltage from the voltage outputting terminals 43.

Figure 3:
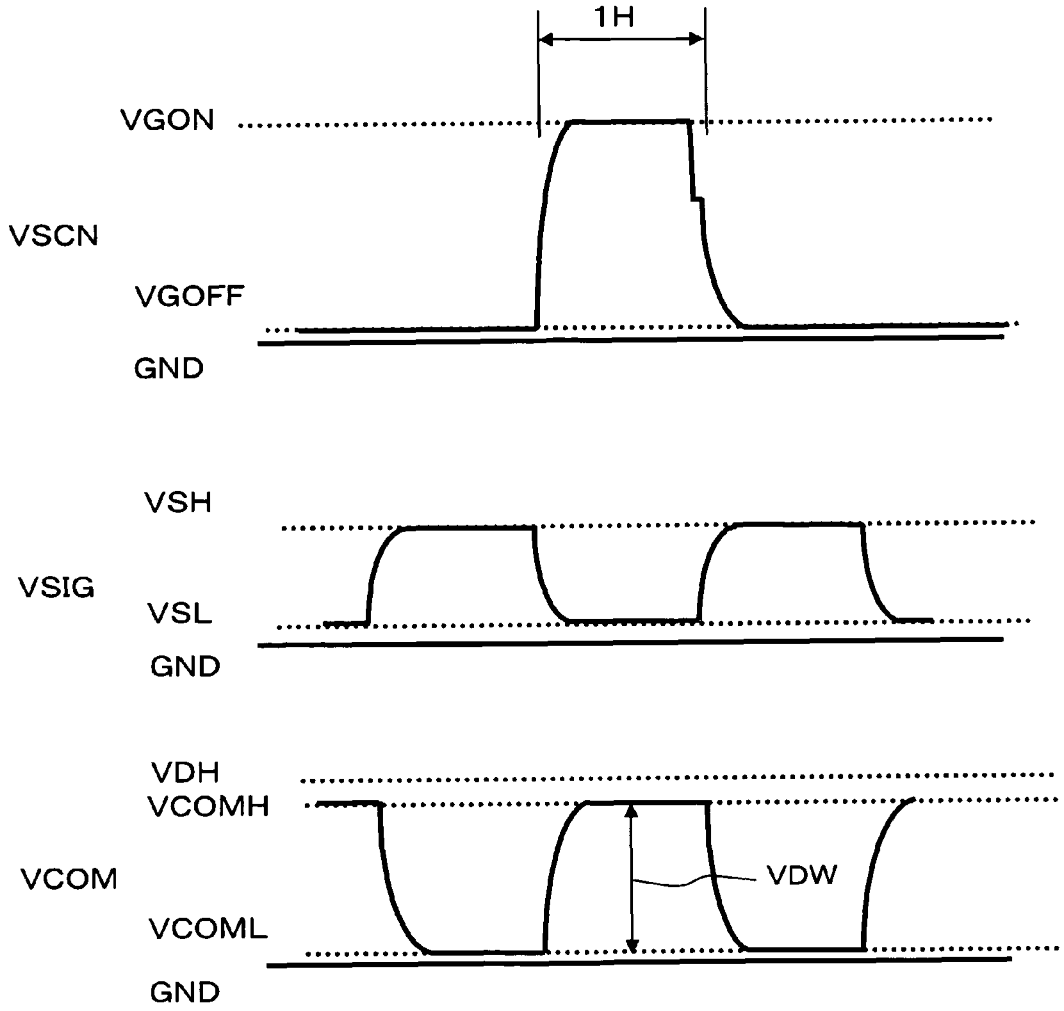
FIG. 3 is a schematic block diagram showing a driver circuit used in the liquid crystal display device of the embodiment 1 according to the present invention.

Next, FIG. 3 shows voltages which the liquid crystal drive voltage generation circuit 61 generates and signal wave forms formed by the respective voltages when the liquid crystal display device adopts a so-called common inversion drive method in which a counter voltage VCOM supplied to the counter electrode 15 is inverted at a fixed cycle.

The scanning signal VSCN shown in FIG. 3 is a scanning signal outputted to the arbitrary scanning signal line 21. In FIG. 3, a period in which the scanning signal VSCN supplied to the scanning signal line 21 assumes a High voltage VGON is referred to as a 1 horizontal scanning period (1H). Here, symbol VGOFF indicates a Low voltage.

In the common inversion drive method, for example, as shown in FIG. 3, the counter voltage VCOM is inverted between VCOMH and VCOML for every 1 horizontal scanning period. Further, a video signal VSIG is also inverted to perform AC driving in conformity with the inversion of the counter voltage VCOM. By adopting the common inversion drive method, even when amplitude of the video signal VSIG is small, a large potential difference can be acquired between the video signal VSIG and the counter voltage VCOM and hence, low-voltage driving and low power consumption can be realized.

In the drawing, symbol VSH of the video signal VSIG indicates that the gradation voltage supplied to the pixel is a positive gradation voltage constituting a signal of positive polarity with respect to the counter voltage VCOM. Symbol VSL of the video signal VSIG indicates that the gradation voltage supplied to the pixel is a negative gradation voltage constituting a signal of negative polarity with respect to the counter voltage VCOM.

Symbol VCOMH indicates a counter-electrode High voltage and symbol VCOML indicates a counter-electrode Low voltage. The counter voltage VCOM is inverted between the High voltage VCOMH and the Low voltage VCOML for every fixed period. Symbol VDH indicates a reference voltage which becomes the reference with respect to the counter-electrode high voltage VCOMH, and symbol VDW indicates an amplitude reference voltage indicative of amplitude of the counter voltage.

In FIG. 3, to facilitate the understanding of the present invention, polarities of voltages are inverted for every 1 horizontal scanning period. However, the polarities of voltages may be inverted for every several horizontal scanning periods or the polarities of voltages may be inverted for every 1 frame period.

Symbol VGON of the scanning signal VSCN indicates a High voltage of the scanning signal VSCN for turning on the thin film transistor (TFT) 10 of a pixel portion, and the High voltage is required to be set to a value higher than a maximum value of the positive gradation voltage VSH by an amount corresponding to a threshold voltage or more. Further, symbol VGOFF of the scanning signal VSCN indicates a Low voltage of the scanning signal VSCN for turning off the thin film transistor 10 and the Low voltage is required to be set to a value lower than a minimum value of the negative gradation voltage VSL by an amount corresponding to a threshold voltage or more.

Figure 4:
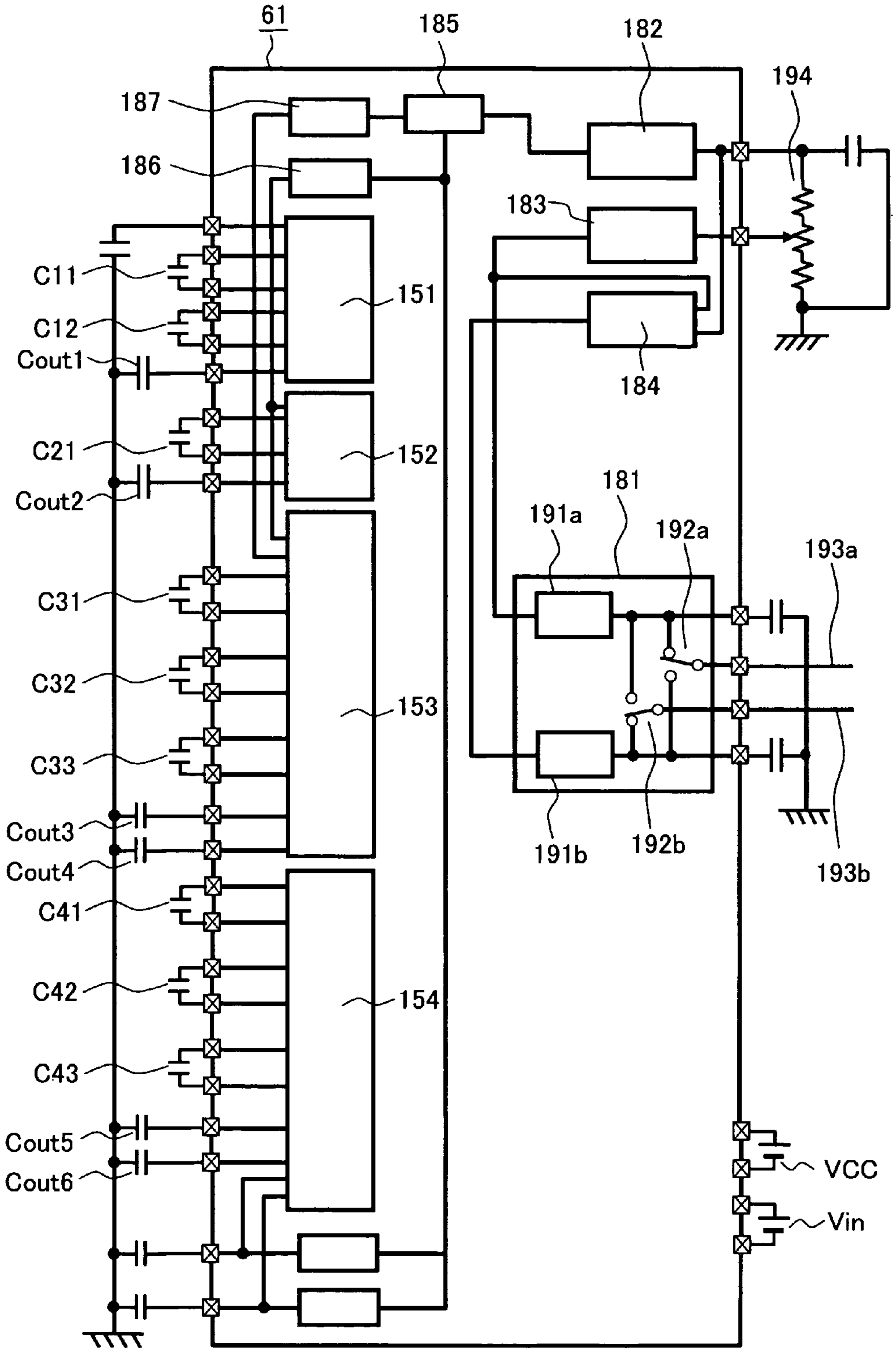
FIG. 4 is a schematic state-transition diagram showing the transition of a state of the driver circuit used in the liquid crystal display device of the embodiment 1 according to the present invention.

Next, FIG. 4 is a block diagram of the liquid crystal drive voltage generation circuit 61 for generating the above-mentioned respective voltages. Numeral 181 indicates a counter voltage outputting circuit, numeral 182 indicates a counter voltage reference voltage circuit, numeral 183 indicates a counter voltage High-level regulation circuit, numeral 184 indicates a counter-voltage Low level regulation circuit, and numeral 185 indicates a reference voltage generation circuit.

The counter voltage reference voltage circuit 182 outputs the reference voltage VDH which becomes the reference with respect to the counter voltage based on the reference voltage outputted from the reference voltage generation circuit 185. The counter voltage reference voltage circuit 182 outputs a voltage which becomes the reference with respect to the counter-electrode High-voltage VCOMH based on the reference voltage VDH.

An output of the counter voltage reference voltage circuit is applied to a variable resistance 194, and the counter voltage High-level regulation circuit 183 generates the counter-electrode high-voltage VCOMH based on the reference voltage inputted from the variable resistance 194. Further, the counter-voltage Low-level setting circuit 184 generates the counter-electrode Low-voltage VCOML by setting the amplitude reference voltage VDW of the counter voltage.

The counter-voltage High-level regulation circuit 183 may generate the counter-electrode High-voltage VCOMH without using the variable resistance 194. That is, based on a regulation value held in a non-volatile memory, a fuse circuit and the like arranged in the counter-voltage High-level regulation circuit 183, the counter-electrode High-voltage VCOMH may be generated to have a voltage value which is obtained by multiplying the reference voltage VDH with the regulation value.

An output of the counter-voltage High-level regulation circuit 183 is inputted to a counter-voltage High-level outputting circuit 191*a* of the counter voltage outputting circuit 181, and an output of the counter-voltage Low-level regulation circuit 184 is inputted to a counter-voltage Low-level outputting circuit 191*b* of the counter voltage outputting circuit 181.

The counter-electrode High-voltage VCOMH is outputted from the counter voltage High-level outputting circuit 191*a*, and is inputted into a switching element 192*a* and a switching element 192*b*. In the same manner, the counter-electrode Low-voltage VCOML is outputted from the counter voltage Low-level outputting circuit 191*b*, and is inputted into the switching element 192*a* and a switching element 192*b*.

The switching elements 192*a*, 192*b* are configured to change over the connections between the outputs from the counter-voltage High-level outputting circuit 191*a* and the counter-voltage Low-level outputting circuit 191*b*, and the first counter voltage output terminal 193*a* and the second counter voltage output terminal 193*b* mutually at a fixed cycle.

Accordingly, it is possible to output the counter-electrode High-voltage VCOMH from the first counter voltage output terminal 193*a* and to output the counter electrode Low-voltage VCOML from the second counter-voltage output terminal 193*b* during a first period, and it is possible to output the counter-electrode Low-voltage VCOML from the first counter voltage output terminal 193*a* and to output the counter electrode High-voltage VCOMH from the second counter-voltage output terminal 193*b* during a second period.

Here, with respect to the inside of a liquid crystal drive voltage generation circuit 61, numeral 186 indicates a first boosting reference voltage circuit which outputs a reference voltage VCl for a first boosting circuit 151 and a second boosting circuit 152. Further, numeral 187 indicates a second boosting reference voltage circuit which outputs a reference voltage VDCDC for a third boosting circuit 153 and a fourth boosting circuit 154.

The first boosting circuit 151 generates a power source voltage DDVDH for a circuit which outputs a video signal to the video signal output lines 42 by boosting the reference voltage VCl. The power source voltage DDVDH is used in the latch circuit 53, the first level shifter 54, the decoder circuit 55, and the first output circuit 56.

The second boosting circuit 152 generates a power source voltage VCL for driving the counter-voltage Low-level output circuit 191*b* by boosting the reference voltage VCl.

The third boosting circuit 153 generates the power source voltage VGH and the power source voltage VGL used in the scanning signal generation circuit 57, the second level shift circuit and the second output circuit 59 for the scanning signal lines 21 by boosting the reference voltage VDCDC.

The fourth boosting circuit 154 generates the power source voltage VSWH and the power source voltage VSWL used in the distribution transistor driver circuit 65 by boosting the reference voltage VDCDC.

Here, capacitances C11, C12, C21, C31, C32, C33, C41, C42 and C43 are boosting capacitances and are used for boosting operations performed by the respective boosting circuits. Capacitances Cout1, Cout2, Cout3, Cout4, Cout5 and Cout6 are holding capacitance elements which are connected with the output terminals.

Next, non-lit regions of the liquid crystal display panel 1 are explained in conjunction with FIG. 5. For example, assume a partial display in which a region of display data outputted from the graphic RAM 52 is small compared to the display region 9. In such a case, a region which the display data of the graphic RAM 52 is not written is formed. There may be a case that the region in which the display data of the graphic RAM 52 is not written is designated as a black display (or a white display). The black display (or the white display) region in which the display data of the graphic RAM 52 is not written is referred to as the non-lit region 27.

Figure 5A:
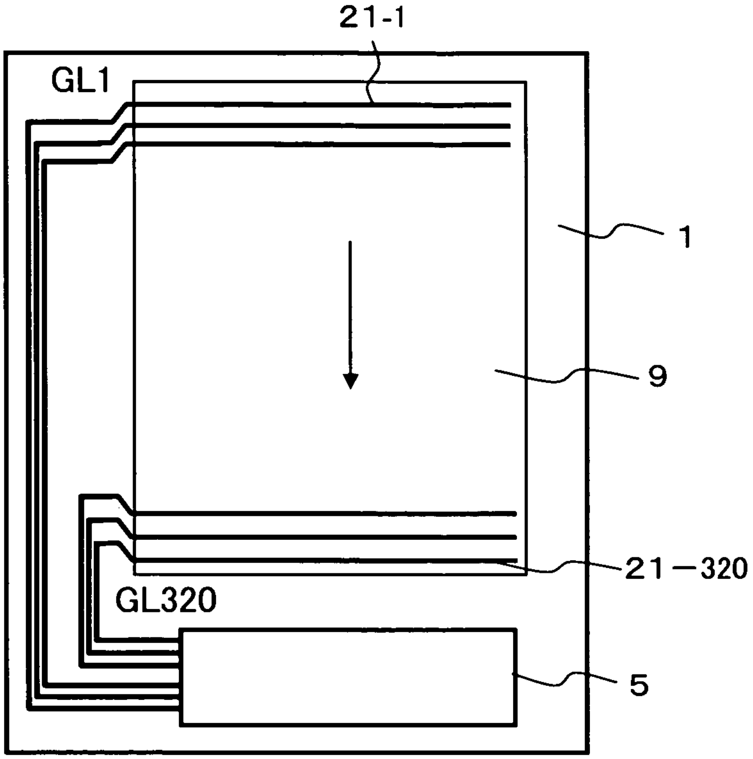
FIG. 5A and FIG. 5B are schematic views showing a command to be recorded in a memory element used in the liquid crystal display device of the embodiment 1 according to the present invention.
Figure 5B:
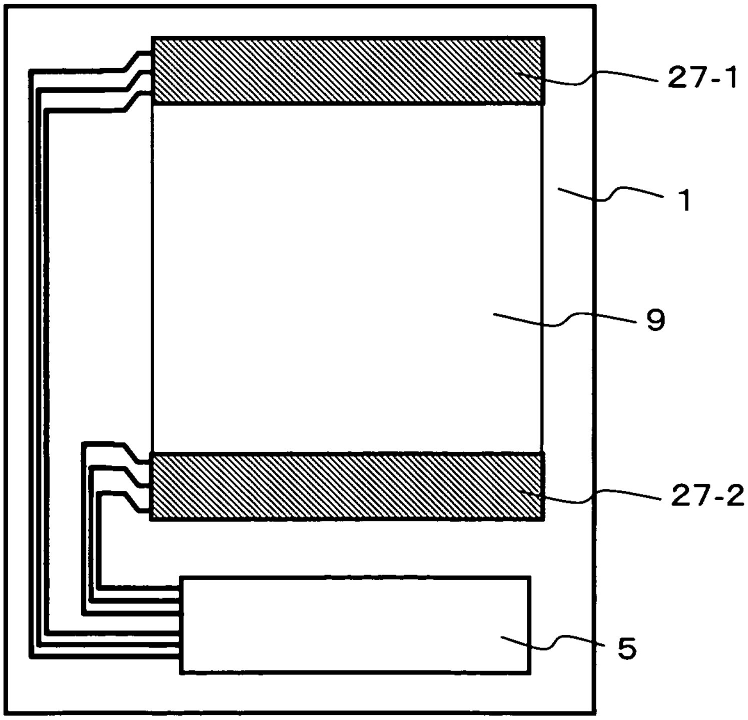

As shown in FIGS. 5A and 5B, a black-display video signal voltage is written in pixels 8 (not shown in the drawing) which are connected with the scanning signal lines 21 on the first several rows and the last several rows thus forming non-lit regions 27-1, 27-2 as shown in FIG. 5B.

The number of scanning signal lines 21 in the non-lit regions 27-1, 27-2 can be set by the register. By setting the number of scanning signal lines 21 using the register, it is possible to designate the number of the scanning signal lines 21 served for the black display.

In outputting the video signal voltage to the non-lit regions 27-1, 27-2, for realizing power saving, the counter electrode voltages of two systems are set to have the same polarity so as to output the video signal continuously with the same polarity.

That is, in outputting the video signal to the pixels which are connected to two neighboring scanning signal lines, when the polarity of the outputting video signal voltage is changed over for every 1 scanning period, an operation for charging the video signal lines and the like is repeated and hence, the power consumption is increased. Accordingly, for achieving the power saving, it is desirable to supply the video signal voltage of the same polarity to the pixels which are connected with two neighboring scanning signal lines.

Further, the plurality of scanning lines may be simultaneously selected in the non-lit region 27 so as to simultaneously write a black-display video signal voltage to the pixels on a plurality of rows. In this case, when the counter electrode voltages VCOMH, VCOML belonging to two systems are outputted, it is necessary to simultaneously output the black-display video signal voltage for positive polarity and the black-display video signal voltage for negative polarity through one video signal line and hence, it is difficult to realize such simultaneous writing of the black-display video signal voltage to the pixels on the plurality of rows.

Accordingly, with respect to the non-lit regions 27-1, 27-2, it is necessary to stop outputting of the counter electrode voltages of two systems having opposite polarities and to output the counter electrode voltages having the same polarity. The above-mentioned counter voltage output circuit 181 is configured to, with the use of the switching element 192*a* and the switching element 192*b*, select a connection mode between a connection mode in which outputting from the counter-voltage High-level output circuit 191*a* is connected with both of the first counter voltage output terminal 193*a* and the second counter voltage output terminal 193*b* and a connection mode in which outputting from the counter-voltage Low-level output circuit 191*b* is connected with both of the first counter voltage output terminal 193*a* and the second counter voltage output terminal 193*b*.

That is, when the video signal is continuously outputted with the same polarity or when the plurality of scanning lines is simultaneously selected in the non-lit regions 27-1, 27-2, the counter voltage output circuit 181 is configured to simultaneously output the counter-electrode High-voltage VCOMH to the first counter-voltage output terminal 193*a* and the second counter-voltage output terminal 193*b*, or is configured to simultaneously output the counter-electrode Low-voltage VCOML to the first counter-voltage output terminal 193*a* and the second counter-voltage output terminal 193*b*.

The counter-voltage output circuit 181 is capable of, in accordance with a set value in the control register 75, selecting a first mode in which the counter voltages having the opposite phases are outputted from the first counter-voltage output terminal 193*a* and the second counter-voltage output terminal 193*b* and a second mode in which the counter voltages having the same phase are outputted from the first counter-voltage output terminal 193*a* and the second counter-voltage output terminal 193*b*.

In accordance with the set value in the control register 75, the driver circuit 5 is configured to allow the counter-voltage output circuit 181 to output the counter voltages of two systems in the first mode and the counter voltages of one system in the second mode.

Here, the switching element 192*a* and the switching element 192*b* do not merely change over the connection between the first counter-voltage output terminal 193*a*, the second counter-voltage output terminal 193*b* and the counter-voltage High-level output circuit 191*a*, the counter-voltage Low-level output circuit 191*b*, but records the polarities of the video signals outputted to the pixels corresponding to the scanning signal line which becomes the reference, and sets the counter-voltage High-level output circuit 191*a*, the counter-voltage Low-level output circuit 191*b* to be connected to the first counter-voltage output terminal 193*a*, the second counter-voltage output terminal 193*b* based on the determination of the polarity of the video signal which becomes the reference.

Further, in setting values in the register in the first mode and in the second mode, the instruction signals are used. However, the values can be set in the register using instruction signals directly from an external control circuit. In this case, by imparting an automatic sequence function or by providing an EPROM and storing instruction signals in the EPROM, necessary set values can be read from the EPROM.

Next, an operation during a retracing period is explained. A period from a point of time that the last scanning signal line 21-320 in the display region 9 is scanned to a point of time that the first scanning signal line 21-1 in the display region 9 is scanned is referred to as the retracing period. It is necessary to output the counter voltages also during this retracing period. Here, the driver circuit 5 is capable of, in accordance with set values in the control register 75, also in the retracing period, selecting the first mode in which the counter voltages having opposite phases are outputted from the first counter-voltage output terminals 193*a* and the second counter-voltage output terminals 193*b* and the second mode in which the counter voltages having the same phase are outputted from the first counter-voltage output terminal 193*a* and the second counter-voltage output terminal 193*b*.

Figure 6:
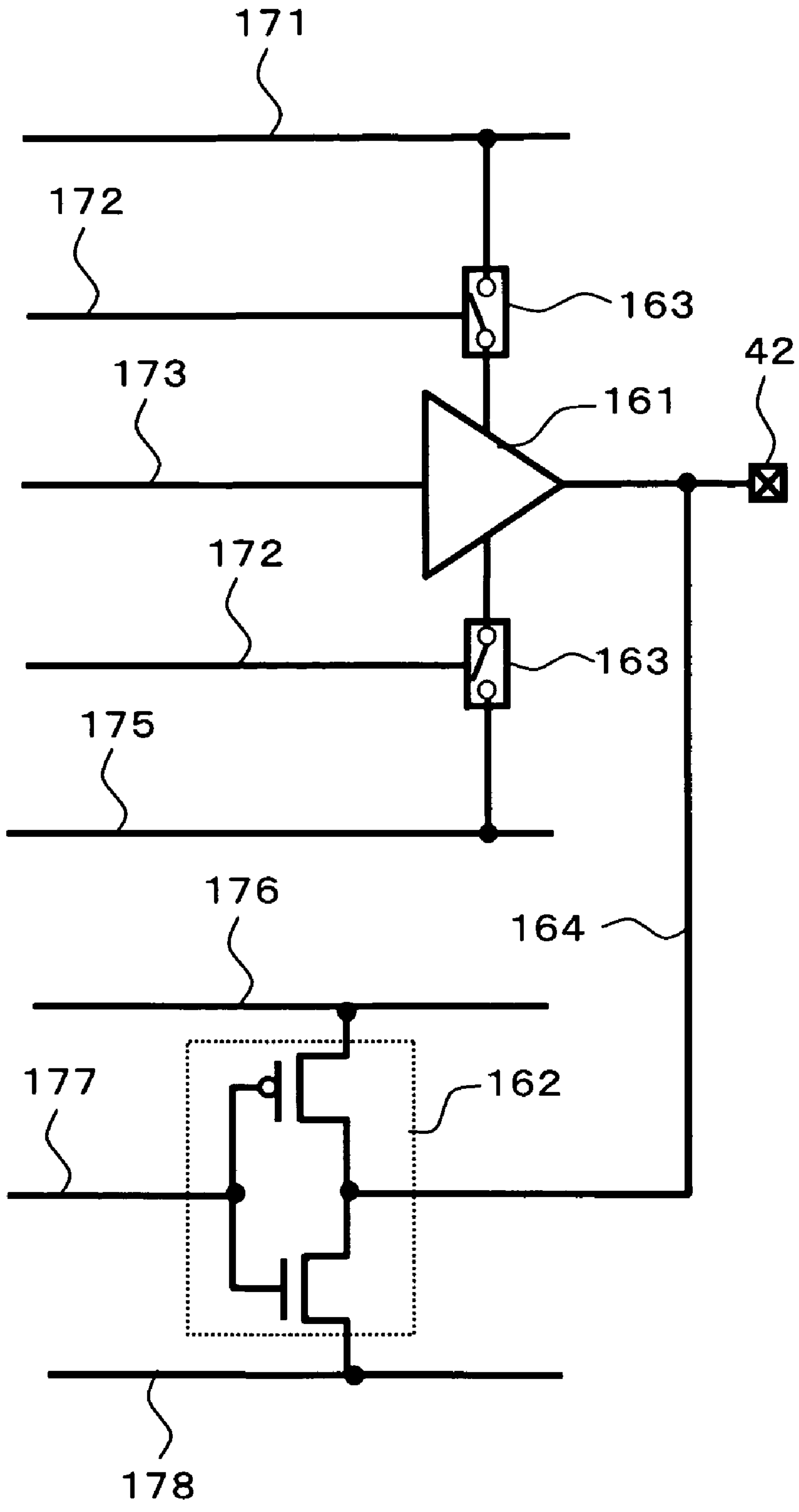
FIG. 6 is a timing chart showing a verifying function of the liquid crystal display device of the embodiment 1 according to the present invention.

Next, a driver circuit of the above-mentioned non-lit region 27 is explained in conjunction with FIG. 6. Numeral indicates an output amplifier provided in the first output circuit 56. A gradation voltage outputted from the decoder circuit 55 is inputted to the output amplifier 161 via a voltage line 173. The output amplifier 161 performs the current amplification and outputs the gradation voltage to the video signal output line 42.

In performing a black display (or white display) in the non-lit region 72, an operation of the output amplifier 161 is stopped and a black display (or white display) voltage is outputted from the output inverter 162 thus realizing a low consumption mode which reduces the power consumption.

That is, in the low consumption mode, the connection of the power source lines 171, 175 to the output amplifier 161 is disconnected using a switching element 163 in response to a signal from a control signal line 172 thus stopping an operation of the output amplifier 161.

Here, the transfer of display data is also unnecessary and hence, it is also possible to stop an operation of the decoder circuit 55. Further, when necessary, it is also possible to partially stop operations of the latch circuit 53, the RGB data selector circuit 51 and the first level shifter circuit 54.

A maximum gradation voltage (V63) used in a black display is supplied to a power source line 176 of the output inverter 162, and a minimum gradation voltage (V0) used in a white display is supplied to a power source line 178.

In the black display, the Low voltage is supplied to the signal line 177 and the maximum gradation voltage (V63) is outputted to the video signal output line 42. In the white display, the High voltage is supplied to the signal line 177 and the minimum gradation voltage (V0) is outputted to the video signal output line 42.

Since the black display (or the white display) is adopted here, the gradation voltage is written in all pixels of RGB and hence, control signals which bring all distribution transistors 6 into an ON state are outputted from the RGB data selector control circuit 65.

The power saving operation using the output inverter 162 can be also used in an 8 gradation display and a 2 gradation display. In case of the 8 gradation display, using an uppermost bit of display data which the latch circuit 53 outputs, when the uppermost bit is “1”, a Low voltage is supplied to the signal line 177 and the maximum gradation voltage (V63) is outputted from the output inverter 162, while when the uppermost bit is “0”, a High voltage is supplied to the signal line 177 and the minimum gradation voltage (V0) is outputted from the output inverter 162.

In case of the 8 gradation display which is the power saving operation, control signals which bring the distribution transistor 6 into an ON state corresponding to RGB outputting are outputted from the RGB data selector control circuit 65.

Figure 7:
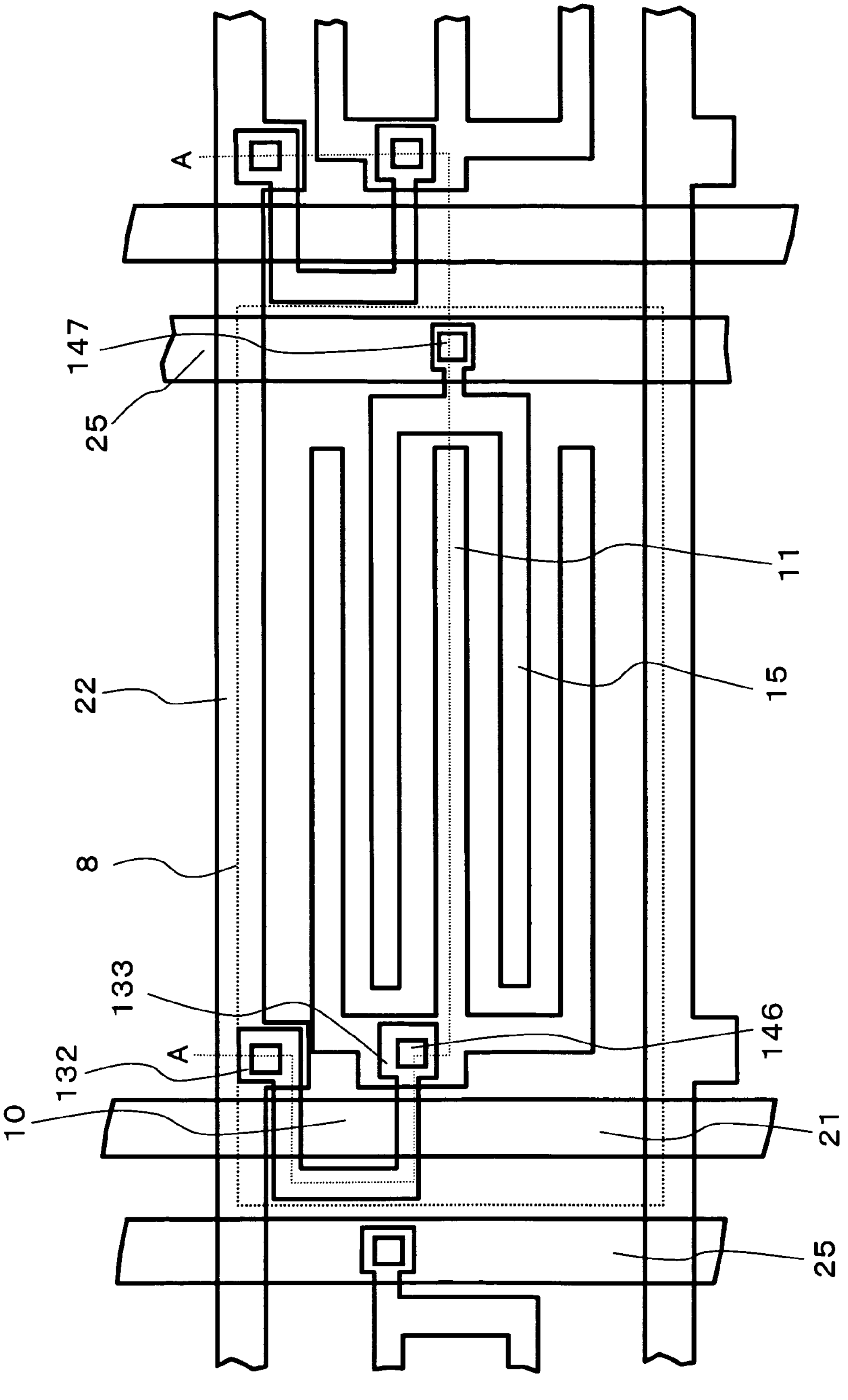
FIG. 7 is a schematic plan view showing a pixel portion of the liquid crystal display device of the embodiment 1 according to the present invention.
Figure 8:
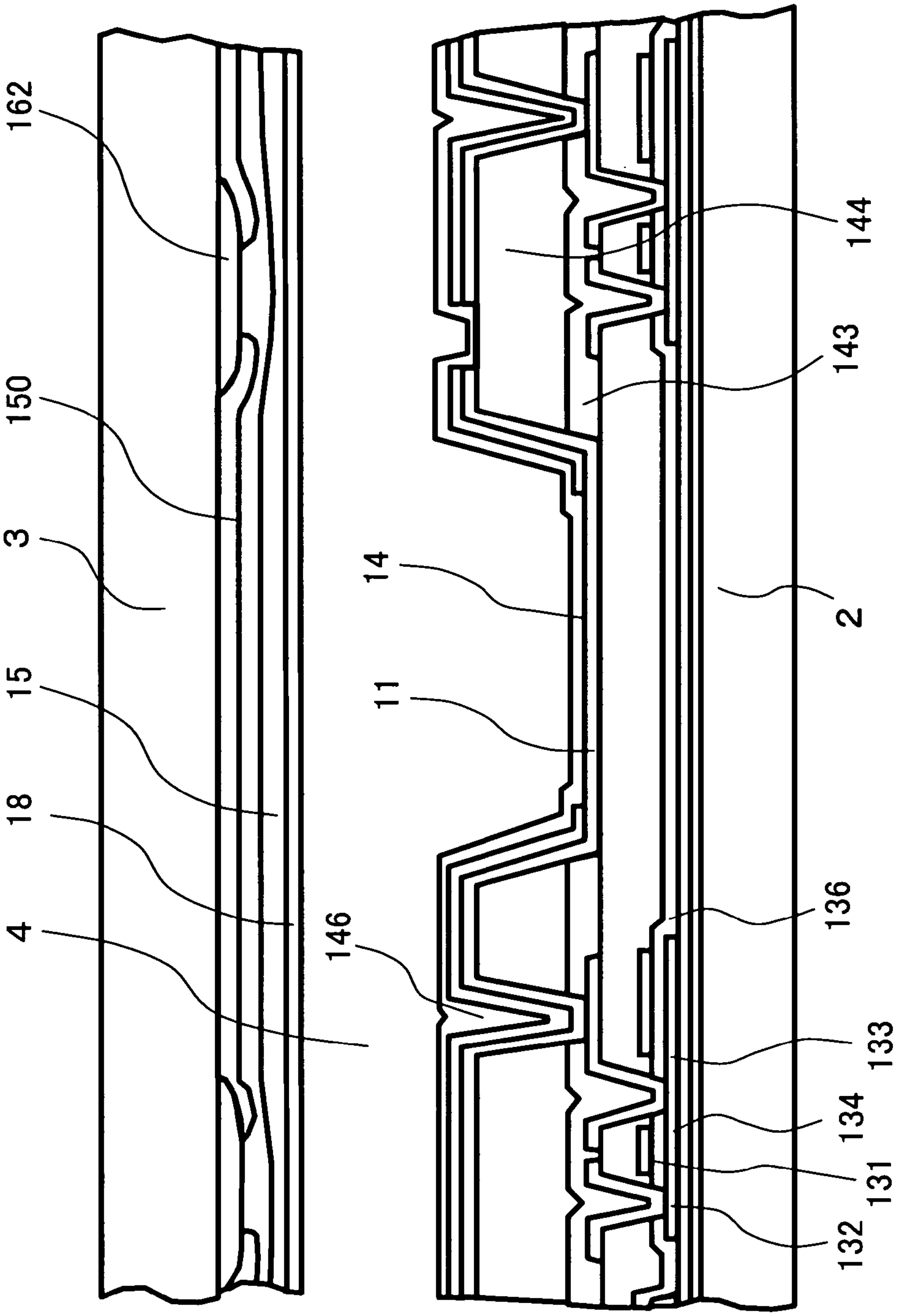
FIG. 8 is a schematic cross-sectional view showing the pixel portion of the liquid crystal display device of the embodiment 1 according to the present invention.

Next, FIG. 7 is a plan view of the pixel portion 8 of the liquid crystal display device 1. FIG. 8 is a cross-sectional view taken along a line A-A in FIG. 7. FIG. 7 and FIG. 8 show the pixel portion 8 of the liquid crystal panel adopting an in-plain switching mode. As shown in FIG. 7, the pixel portions 8 are formed on the TFT substrate 2, and each pixel portion 8 is formed of a region surrounded by the scanning signal line 21, the counter electrode signal line 25 and the video signal lines 22.

As described previously, the switching element (hereinafter also referred to as TFT) 10 and the pixel electrode 11 are formed in the vicinity of an intersecting portion of the scanning signal line 21 and the video signal line 22. The pixel electrode 11 and the counter electrode 15 are formed in a comb-teeth shape and are alternately arranged. Due to the potential difference generated between the video signal voltage supplied to the pixel electrode 11 and the counter voltage supplied to the counter electrode 15, the alignment direction of the liquid crystal molecules is changed thus realizing a control of intensity of transmitting light.

Numeral 132 indicates a drain region and numeral 133 indicates a source region, and these regions 132, 133 are formed on a semiconductor layer 134 described later. The drain region 132, the source region 133 and the semiconductor layer 134 form the TFT 10. A through hole indicated by numeral 146 electrically connects the source region 133 and the pixel electrode 11. A through hole indicated by numeral 147 electrically connects the counter electrode 15 and the counter electrode signal line 25.

The liquid crystal display panel 1 has the cross-sectional structure shown in FIG. 8, wherein the TFT substrate 2 and the color filter substrate 3 are arranged to face each other in an opposed manner. The liquid crystal composition 4 is held between the TFT substrate 2 and the color filter substrate 3. Between peripheral portions of the TFT substrate 2 and the color filter substrate 3, a sealing material (not shown in the drawing) is provided. The TFT substrate 2, the color filter substrate 3 and the sealing material form a container or an envelope which has a narrow gap, and the liquid crystal composition 4 is sealed between the TFT substrate 2 and the color filter substrate 3. Further, numerals 14 and 18 respectively indicate alignment films for controlling the alignment of the liquid crystal molecules.

Color filters 150 are formed on the color filter substrate 3 for respective colors consisting of red (R), green (G), and blue (B). A black matrix 162 is formed on a boundary between the respective color filters 150 for blocking light.

The TFT substrate 2 is made of glass, resin or the like which is at least partially transparent. A background film is formed on the TFT substrate 2, and a semiconductor layer 134 constituted of a polysilicon film is formed on the background film.

A gate insulation film 136 is formed on the semiconductor layer 134, and the gate electrodes 131 are formed on the gate insulation film 136. As described previously, the scanning signal lines 21 are formed on the TFT substrate 2, and a portion of the scanning signal line 21 forms the gate electrode 131. The scanning signal line 21 is formed of a multi-layered film consisting of a layer which is mainly made of chromium (Cr) or zirconium and a layer which is mainly made of aluminum (Al) Further, side surfaces of the scanning signal line 21 are inclined such that a line width of the canning signal line 21 is increased toward a lower surface thereof on a TFT substrate side from an upper surface thereof.

Both end portions of the semiconductor layer 134 are doped with impurities thus forming the drain region 132 and the source region 133 in a spaced-apart manner. As described previously, although naming of drain and source changes depending on potentials, in this specification, the region which is connected with the video signal line 22 is referred to as the drain region and the region which is connected with the pixel electrode 11 is referred to as the source region.

The video signal line 22 is formed of a multi-layered film which is constituted by sandwiching a layer mainly made of aluminum (Al) by two layers mainly made of an alloy of molybdenum (Mo) and chromium (Cr), molybdenum (Mo) or tungsten (W). Further, an inorganic insulation film 143 and an organic insulation film 144 are formed on the TFT substrate 2 so as to cover the TFT 30. The source region 133 is connected with the pixel electrode 11 via a through hole 146 formed in the inorganic insulation film 143 and the organic insulation film 144.

Here, the inorganic insulation film 143 may be formed using silicon nitride or silicon oxide, and the organic insulation film 144 may be formed of an organic resin film. Although a surface of the organic insulation film 144 may be formed in a relatively flat shape, the surface may be formed to have unevenness.

The pixel electrode 11 and the counter electrode 15 are formed of a transparent conductive film, and the transparent conductive film is formed of a light-transmitting conductive layer made of ITO (Indium Tin Oxide), ITZO (Indium Tin Zinc Oxide), IZO (Indium Zinc Oxide), ZnO (Zinc Oxide), SnO (Tin oxide), In2O3 (Indium Oxide) or the like.

Further, the above-mentioned layer mainly made of chromium may be formed using only chromium or an alloy of chromium and molybdenum (Mo) or the like. The layer mainly made of zirconium may be formed using only zirconium or an alloy of zirconium and molybdenum or the like. The layer mainly made of tungsten may be formed using only tungsten or an alloy of tungsten and molybdenum or the like. The layer mainly made of aluminum may be formed using only aluminum or an alloy of aluminum and neodymium or the like.

The invention claimed is:

1. A liquid crystal display device comprising:
a first substrate;
a second substrate;
liquid crystal composition which is sandwiched between the first substrate and the second substrate;
a plurality of pixel electrodes which are formed on the first substrate;
counter electrodes which are arranged to face the pixel electrodes in an opposed manner;
switching elements which are configured to supply video signals to the pixel electrodes;
video signal lines which are configured to supply video signals to the switching elements;
scanning signal lines which are configured to supply scanning signals for controlling the switching elements;
first counter electrode signal lines which are configured to supply a first voltage to the counter electrodes;
second counter electrode signal lines which are configured to supply a second voltage to the counter electrodes; and
a driver circuit which is configured to output the video signals and the scanning signals, wherein
a first scanning signal line and a second scanning signal line which constitute two neighboring scanning signal lines are provided with first pixel electrodes to which the video signals are supplied from the switching elements which are controlled in response to the scanning signals supplied through the first scanning signal line, and second pixel electrodes to which the video signals are supplied from the switching elements which are controlled in response to the scanning signals supplied through the second scanning signal line,
a first counter electrode signal line is connected to the counter electrodes which face the first pixel electrodes in an opposed manner,
a second counter electrode signal line is connected to the counter electrodes which face the second pixel electrodes in an opposed manner,
the liquid crystal display device is driven in a first mode in which polarity of a voltage applied to the first counter electrode signal line and polarity of a voltage applied to the second counter electrode signal line are set opposite to each other during a first scanning period in which the scanning signals are outputted to the first scanning signal line, and
the liquid crystal display device is configured to be capable of selecting a second mode in which the voltage applied to the first counter electrode signal line and the voltage applied to the second counter electrode signal line have the same polarity during a retracing period from a point of time that outputting of the scanning signal to the scanning signal line on the last row is finished to a point of time that outputting of the scanning signal to the scanning signal line on a start row is started.

2. A liquid crystal display device according to claim 1, wherein the driver circuit includes a first voltage generation circuit which is configured to output the first voltage and a second voltage generation circuit which is configured to output the second voltage.

3. A liquid crystal display device according to claim 1, wherein the driver circuit includes,
a first voltage generation circuit which is configured to output the first voltage and a second voltage generation circuit which is configured to output the second voltage;

a first switching circuit which is configured to change over the connection between the first voltage generation circuit and the first counter electrode signal line or the second counter electrode signal line; and a second switching circuit which is configured to change over the connection between the second voltage generation circuit and the first counter electrode signal line or the second counter electrode signal line.

4. A liquid crystal display device comprising:

a first substrate;

a second substrate;

liquid crystal composition which is sandwiched between the first substrate and the second substrate;

a plurality of pixel electrodes which are formed on the first substrate;

counter electrodes which are arranged to face the pixel electrodes in an opposed manner;

switching elements which are configured to supply video signals to the pixel electrodes;

video signal lines which are configured to supply video signals to the switching elements;

scanning signal lines which are configured to supply scanning signals for controlling the switching elements;

first counter electrode signal lines which are configured to supply a first voltage to the counter electrodes;

second counter electrode signal lines which are configured to supply a second voltage to the counter electrodes; and a driver circuit which is configured to output the video signals and the scanning signals, wherein the driver circuit is configured to be capable of changing over an operation of the liquid crystal display device between a first mode in which the scanning signals are outputted while inverting polarity of the first voltage and polarity of the second voltage and a second mode in which the scanning signals are outputted while allowing the polarity of the first voltage and the polarity of the second voltage to have the same phase at the time of performing power saving driving in which the scanning signals are supplied to the plurality of scanning signal lines.

5. A liquid crystal display device according to claim 4, wherein the driver circuit includes a first voltage generation circuit which is configured to output the first voltage and a second voltage generation circuit which is configured to output the second voltage.

6. A liquid crystal display device according to claim 4, wherein the driver circuit includes:

a first voltage generation circuit which is configured to output the first voltage and a second voltage generation circuit which is configured to output the second voltage;

a first switching circuit which is configured to change over the connection between the first voltage generation circuit and the first counter electrode signal line or the second counter electrode signal line; and a second switching circuit which is configured to change over the connection between the second voltage generation circuit and the first counter electrode signal line or the second counter electrode signal line.

7. A liquid crystal display device comprising:

a first substrate;

a second substrate;

liquid crystal composition which is sandwiched between the first substrate and the second substrate;

a plurality of pixel electrodes which are formed on the first substrate;

counter electrodes which are arranged to face the pixel electrodes in an opposed manner;

switching elements which are configured to supply video signals to the pixel electrodes;

video signal lines which are configured to supply video signals to the switching elements;

scanning signal lines which are configured to supply scanning signals for controlling the switching elements;

first counter electrode signal lines which are configured to supply a first voltage to the counter electrodes;

second counter electrode signal lines which are configured to supply a second voltage to the counter electrodes; and a driver circuit which is configured to output the video signals and the scanning signals, wherein the driver circuit is configured to be capable of changing over an operation of the liquid crystal display device between a first mode in which the scanning signals are outputted while inverting polarity of the first voltage and polarity of the second voltage and a second mode in which the scanning signals are outputted while allowing the polarity of the first voltage and the polarity of the second voltage to have the same phase at the time of performing a power saving operation in which the video signals are outputted from an inverter circuit provided to an output circuit.

8. A liquid crystal display device according to claim 7, wherein the driver circuit includes a first voltage generation circuit which is configured to output the first voltage and a second voltage generation circuit which is configured to output the second voltage.

9. A liquid crystal display device according to claim 7, wherein the driver circuit includes, a first voltage generation circuit which is configured to output the first voltage and a second voltage generation circuit which is configured to output the second voltage;

a first switching circuit which is configured to change over the connection between the first voltage generation circuit and the first counter electrode signal line or the second counter electrode signal line; and a second switching circuit which is configured to change over the connection between the second voltage generation circuit and the first counter electrode signal line or the second counter electrode signal line.

* * * * *